March 26, 1946. M. L. FORREST 2,397,312
POWER TRANSMISSION MECHANISM
Filed May 16, 1944

INVENTOR
MARK L. FORREST
BY Chapin & Neal
ATTORNEYS

Patented Mar. 26, 1946

2,397,312

UNITED STATES PATENT OFFICE 2,397,312

POWER TRANSMISSION MECHANISM

Mark L. Forrest, Framingham, Mass.

Application May 16, 1944, Serial No. 535,844

6 Claims. (Cl. 74—216.5)

This invention relates to power transmission mechanism of the belt and pulley type and has for its object the provision of a positive and non-slipping drive which will be substantially noiseless in operation.

My improvement will find special utility in any mechanism which requires an accurately timed relation between a driving part and a driven part such as in the drive for a distributor shaft or magneto shaft in engines which heretofore has been taken care of by gears or chain connections. The chain or gear drive has the advantage of being positive but unless expensively constructed is apt to be noisy especially at high speeds, such a drive must be protected from the elements viz. water, dust and dirt and it requires constant lubrication. The usual belt drive while not open to these objections, is subject to slipping which renders it inappropriate for any accurately timed shaft ratio operation. In general the present invention combines the advantages of both the chain and belt drive without the defects of either. In the preferred embodiment shown I have disclosed a construction adapted for economical manufacture and durable use which will have the advantageous characteristics above set forth.

Referring to the drawing which shows a preferred embodiment of my invention;

Figure 1:
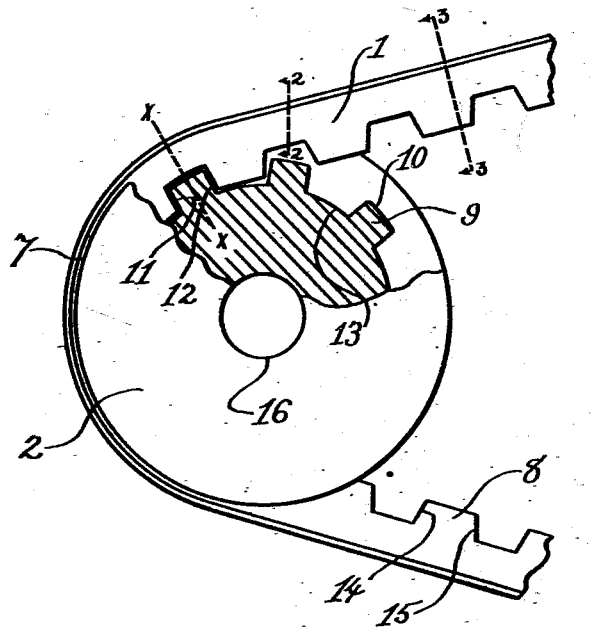
Fig. 1 is a side view of the pulley and belt drive, the upper part of one side of the pulley being broken away to show clearly the driving engagement.

Referring more particularly to the drawing the flexible belt is indicated at 1 and the pulley at 2. Either of these elements may be the driving member and the other the driven member. The complete drive will obviously comprise a duplication of the construction shown, at the other loop end of the belt not shown.

Figures 2, 3, 4:
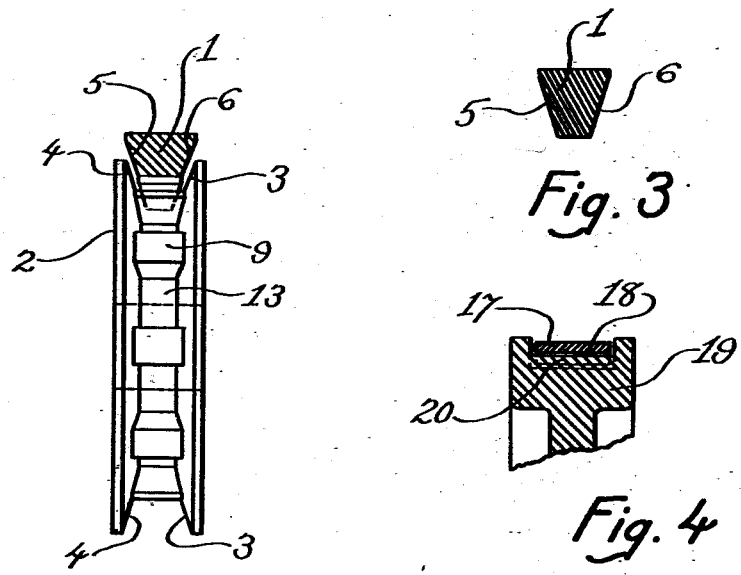
Fig. 2 is an end view of the pulley with the upper run of the belt in section at line 2—2 Fig. 1 and the remainder of the belt removed.
Fig. 3 is a transverse section of the belt at 3—3 Fig. 1.
Fig. 4 is a fragmentary transverse section of a modified form of pulley and belt.

In one form of construction the belt 1 and its pulley 2 may be somewhat like the well known V belt drive. For example as shown in Figs. 1 and 2 the pulley may be formed with a deep peripheral groove having outwardly flaring sides 3 and 4. For running engagement in the pulley groove the belt 1 is wedge shaped in cross section with its sides 5 and 6 converging inwardly. Preferably the overall thickness of the belt is substantially the depth of the groove whereby the outer surface of the belt in going round the pulley lies nearly but not quite flush with the top 7 of the sides 3 and 4 of the pulley groove.

As shown in Fig. 2 the converging sides of the wedge shaped belt are spaced from the sides of the groove to afford a slight clearance. In other words the width of the belt is slightly less than the width of the pulley groove whereby the drive connection between the belt and pulley is not as in the ordinary V belt at the sides of the belt and pulley groove. The drive connection in the present improvement is provided wholly by a spur gear like mesh between a series of teeth 8 on the inner side of the belt 1 and teeth 9 formed on the bottom periphery of the pulley groove. The purpose of providing the excess width or clearance in the pulley groove is to cause the riding engagement between the belt and pulley to occur between the tooth tops and socket bottoms of said belt and pulley members whereby much of the wear and frictional heat is taken up by parts of the belt not subject to heavy load.

The teeth 9 extend clear across the pulley groove and their tops 10 are somewhat below the top 7 of the grooves sides. The fore and aft engaging flanks 11 and 12 of each tooth 9 are substantially parallel with a radial center line $x$—$x$ through said tooth as shown. The bottom of the pulley groove is thereby formed into a series of tooth sockets 13 alternating with the teeth 9 and are shaped for a non-slipping drive mesh with the complementary teeth 8 formed on the inner side of the belt 1. Each tooth 8 projecting from the inner side of the belt 1 is formed with its fore and aft engaging flanks 14 and 15 in a converging relation whereby the belt teeth are wedge shaped, in contrast to the more straight-sided block shape of the pulley teeth. It will be appreciated that this difference in shape between the belt teeth and pulley teeth contributes to their complementary meshed engagement since the belt in turning around the pulley, bends more easily at each of its thin sections between the teeth 8 such as at X—X and this action causes the opposing flanks of adjacent belt teeth to swing toward one another into coinciding relation with the parallel straight sides of an embraced pulley tooth as shown.

The pulley 2 may be made of any hard rigid material, metal, wood, hard rubber, synthetic plastic or the like. The shaft of the pulley is illustrated diagrammatically at 16 and any suitable bearing mount may be provided therefore. The belt 1 is relatively soft and flexible and for noiseless operation is of a composition other than metal such as a combination of rubber and fabric or impregnated leather and the like. It will be noted that the body of the belt and its teeth are formed as one integral whole and is devoid of fastenings or other attached parts which might be torn off during use. The art of fabricating and molding to shape such a belt of tough flexible composition material is well known and a belt of this character can be made at low cost to endure for long periods of use.

In the modification shown in Fig. 4 a relatively wide and thin belt 17 is employed for running in a relatively shallow straight sided groove 18 of a pulley 19. As shown the width of the pulley groove is slightly greater than that of the belt and the teeth of the pulley extend transversely entirely across said pulley groove. In this form the underside of the belt will be provided with teeth 20 for a meshed driving engagement with teeth in the bottom of pulley groove 19 of the same general formation as previously described.

It is to be understood that the present specific disclosure is for the purpose of illustration only and that my invention includes all modifications and equivalents within the scope of the appended claims.

What I claim is:

1. A power transmission mechanism of the belt and pulley type comprising a peripherally grooved pulley having formed at the bottom of its groove alternating sprocket teeth and tooth sockets, said pulley teeth extending transversely from side to side of said groove and having their tops substantially below the top of the groove sides, an endless flexible belt disposed in running engagement in said pulley groove, said belt being composed of noiseless non metallic material and having formed as an integral inner part thereof complemental sprocket teeth adapted for a spur gear driving mesh with the teeth and sockets of said pulley groove said belt being of a width to provide a slight clearance between its sides and the sides of said groove.

2. A power transmission mechanism of the belt and pulley type comprising a peripherally grooved pulley having formed at the bottom of its groove alternating sprocket teeth and tooth sockets, each of said pulley teeth being shaped with its engaging flanks substantially parallel to one another and to the radius center line of said tooth, an endless flexible belt disposed in running engagement in said pulley groove, said belt being composed of noiseless non metallic material and having formed as an integral inner part thereof complemental sprocket teeth adapted for a spur gear driving mesh with the teeth and sockets of said pulley groove, each of said belt teeth being wedge shaped with its engaging flanks in converging relation.

3. A power transmission mechanism of the belt and pulley type comprising a peripherally grooved pulley having formed at the bottom of its groove alternating sprocket teeth and tooth sockets, the sides of said groove flaring outwardly like a V belt groove, an endless flexible belt shaped in cross section like a V belt disposed in running engagement in said pulley groove, said belt being composed of noiseless non metallic material and having formed as an integral inner part thereof complemental sprocket teeth adapted for a spur gear driving mesh with the teeth and sockets of said pulley groove, said belt being of a width to provide a slight clearance between its sides and the sides of said groove so that the riding engagement between the belt and pulley will occur between the tooth tops and the socket bottoms of said belt and pulley members.

4. A power transmission mechanism of the belt and pulley type comprising a peripherally grooved pulley having formed at the bottom of its groove alternating sprocket teeth and tooth sockets, each of said pulley teeth being shaped with its engaging flanks in substantial parallelism, the sides of said groove flaring outwardly like a V belt groove, an endless flexible belt shaped in cross section like a V belt disposed in running engagement in said pulley groove, said belt being composed of noiseless non metallic material and having formed as an integral inner part thereof complemental sprocket teeth adapted for a spur gear driving mesh with the teeth and sockets of said pulley groove, each of said belt teeth being wedge shaped with its engaging flanks in converging relation.

5. A power transmission mechanism of the belt and pulley type comprising a peripherally grooved pulley having formed at the bottom of its groove alternating sprocket teeth and tooth sockets, said pulley teeth extending transversely from side to side of said groove and having their tops substantially below the top of the groove sides, each of said pulley teeth being shaped with its engaging flanks in substantial parallelism, the sides of said pulley groove flaring outwardly like a V belt groove, an endless flexible belt shaped in cross section like a V belt disposed in running engagement in said pulley groove, said belt being composed of noiseless non metallic material and having formed as an integral inner part thereof complemental sprocket teeth adapted for a spur gear driving mesh with the teeth and sockets of said pulley groove, each of said belt teeth being wedge shaped with its engaging flanks in converging relation, said belt being of a width to provide a slight clearance between its sides and the sides of said groove and of an overall thickness substantially equal to the depth of said pulley groove.

6. A power transmission mechanism of the belt and pulley type comprising a peripherally grooved pulley having formed at the bottom of its groove alternating sprocket teeth and tooth sockets, said pulley teeth extending transversely from side to side of said groove and having their tops substantially below the top of the groove sides, each of said pulley teeth being shaped with its engaging flanks substantially parallel to one another and to the radius center line of said tooth, said belt being composed of noiseless non metallic material and having formed as an integral inner part thereof complemental sprocket teeth adapted for a spur gear driving mesh with the teeth and sockets of said pulley groove, said belt being of a width to provide a slight clearance between its sides and the sides of said groove.

MARK L. FORREST.